(12) United States Patent
Yudasaka

(10) Patent No.: US 7,647,505 B2
(45) Date of Patent: Jan. 12, 2010

(54) RECORDING MEDIUM, RECORDING MEDIUM READING/WRITING APPARATUS, AND METHOD OF USING RECORDING MEDIUM

(75) Inventor: Ichio Yudasaka, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 10/384,542

(22) Filed: Mar. 11, 2003

(65) Prior Publication Data

US 2003/0172279 A1  Sep. 11, 2003

(30) Foreign Application Priority Data

Mar. 11, 2002  (JP)  ............................ 2002-066128

(51) Int. Cl.
*G06F 21/00*  (2006.01)
(52) U.S. Cl. ..................... 713/186; 713/166; 713/176
(58) Field of Classification Search .................. 726/20, 726/9, 5; 713/186, 176, 166
See application file for complete search history.

(56) References Cited

U.S. PATENT DOCUMENTS

| | | | | |
|---|---|---|---|---|
| 4,734,568 A * | 3/1988 | Watanabe | .................... | 235/487 |
| 4,849,614 A | 7/1989 | Watanabe et al. | | |
| 4,853,522 A * | 8/1989 | Ogasawara | .................. | 235/380 |
| 4,961,142 A * | 10/1990 | Elliott et al. | ................... | 705/73 |
| 5,285,055 A * | 2/1994 | Oonakahara et al. | ........ | 235/380 |
| 5,552,586 A * | 9/1996 | Kalman | ....................... | 235/380 |
| 5,768,382 A * | 6/1998 | Schneier et al. | ............. | 380/251 |
| 5,790,668 A * | 8/1998 | Tomko | ........................ | 713/186 |
| 5,960,085 A * | 9/1999 | de la Huerga | ............... | 340/5.61 |
| 6,041,412 A * | 3/2000 | Timson et al. | ................. | 726/3 |
| 6,044,470 A * | 3/2000 | Kuriyama | .................... | 726/19 |
| 6,052,468 A * | 4/2000 | Hillhouse | ................... | 380/281 |
| 6,084,968 A * | 7/2000 | Kennedy et al. | ............ | 380/259 |
| 6,181,803 B1 * | 1/2001 | Davis | ......................... | 382/115 |
| 6,198,996 B1 * | 3/2001 | Berstis | ......................... | 701/36 |
| 6,219,439 B1 * | 4/2001 | Burger | ........................ | 382/115 |
| 6,317,834 B1 * | 11/2001 | Gennaro et al. | ............. | 713/186 |
| 6,351,817 B1 * | 2/2002 | Flyntz | ............................ | 726/4 |
| 6,389,542 B1 * | 5/2002 | Flyntz | .......................... | 726/17 |
| 6,463,537 B1 * | 10/2002 | Tello | ........................... | 713/182 |
| 6,490,680 B1 * | 12/2002 | Scheidt et al. | ............... | 713/166 |
| 6,606,707 B1 * | 8/2003 | Hirota et al. | ................. | 713/172 |

(Continued)

FOREIGN PATENT DOCUMENTS

EP  1111557 A2  6/2001

(Continued)

*Primary Examiner*—David García Cervetti
(74) *Attorney, Agent, or Firm*—Oliff & Berridge, PLC

(57) ABSTRACT

The current society can be referred to as a card society, since people can use various types of cards for a variety of applications. However, card users must always carry a number of cards depending upon the application, and must use different cards according to the purpose, which can bother such users. A memory of an IC chip of an IC card includes a fingerprint information area to verify the identity of a card owner, a personal information area in which personal information of the card owner is classified and recorded with different security levels set up, a company information area in which each company writes information of the company using an "encryption key" unique to the company, and a public organization information area in which each public organization writes information of the public organization using an "encryption key" unique to the public organization.

17 Claims, 7 Drawing Sheets

U.S. PATENT DOCUMENTS

| | | | |
|---|---|---|---|
| 6,622,014 B1* | 9/2003 | Daniel | 455/411 |
| 6,657,538 B1* | 12/2003 | Ritter | 340/5.81 |
| 6,694,025 B1* | 2/2004 | Epstein et al. | 380/279 |
| 6,721,891 B1* | 4/2004 | Borza | 726/20 |
| 6,848,038 B1* | 1/2005 | Bohler | 711/163 |
| 6,941,376 B2* | 9/2005 | Mitchell et al. | 709/229 |
| 6,944,766 B2* | 9/2005 | Hamada | 713/182 |
| 6,957,337 B1* | 10/2005 | Chainer et al. | 713/186 |
| 7,111,173 B1* | 9/2006 | Scheidt | 713/186 |
| 7,137,008 B1* | 11/2006 | Hamid et al. | 713/182 |
| 7,137,553 B2* | 11/2006 | Register et al. | 235/382.5 |
| 7,162,645 B2* | 1/2007 | Iguchi et al. | 713/193 |
| 7,178,025 B2* | 2/2007 | Scheidt et al. | 713/186 |
| 7,188,086 B2* | 3/2007 | Shinzaki et al. | 705/51 |
| 7,191,466 B1* | 3/2007 | Hamid et al. | 726/3 |
| 2002/0010679 A1* | 1/2002 | Felsher | 705/51 |
| 2002/0030581 A1* | 3/2002 | Janiak et al. | 340/5.53 |
| 2002/0060243 A1* | 5/2002 | Janiak et al. | 235/382 |
| 2002/0124176 A1* | 9/2002 | Epstein | 713/186 |
| 2003/0004881 A1* | 1/2003 | Shinzaki et al. | 705/51 |
| 2003/0012415 A1* | 1/2003 | Cossel | 382/124 |
| 2003/0140232 A1* | 7/2003 | De Lanauze | 713/186 |
| 2003/0140233 A1* | 7/2003 | Samar | 713/186 |
| 2003/0172280 A1* | 9/2003 | Scheidt et al. | 713/182 |
| 2003/0177347 A1* | 9/2003 | Schneier et al. | 713/151 |
| 2003/0219121 A1* | 11/2003 | van Someren | 380/44 |
| 2003/0225596 A1* | 12/2003 | Richardson et al. | 705/2 |
| 2004/0010697 A1* | 1/2004 | White | 713/186 |
| 2004/0111625 A1* | 6/2004 | Duffy et al. | 713/186 |
| 2004/0250085 A1* | 12/2004 | Tattan et al. | 713/186 |
| 2005/0235148 A1* | 10/2005 | Scheidt et al. | 713/168 |

FOREIGN PATENT DOCUMENTS

| | | |
|---|---|---|
| JP | 59-043473 | 3/1984 |
| JP | A 62-152898 | 7/1987 |
| JP | 62-177696 | 8/1987 |
| JP | 62-200441 | 9/1987 |
| JP | 63-073348 | 4/1988 |
| JP | 06-282701 | 10/1994 |
| JP | 09-106470 | 4/1997 |
| JP | 11-085881 | 3/1999 |
| JP | A 11-338985 | 12/1999 |
| JP | 2000-215279 | 8/2000 |
| JP | 2000-285210 | 10/2000 |
| JP | A 2001-167241 | 6/2001 |

* cited by examiner

| SECURITY LEVEL | | | | | | |
|---|---|---|---|---|---|---|
| ① | ② | ③ | ④ | ⑤ | ⑥ | |
| WITHOUT SETTING UP SECURITY | ONLY "PASSWORD" | ONLY "FINGERPRINT" | "FINGERPRINT" AND "ENCRYPTION KEY" | "FINGERPRINT", "ENCRYPTION KEY" AND "PASSWORD" | "FINGERPRINTS" OF A PLURALITY OF INDIVIDUALS | |
| PERSONAL INFORMATION SELECTED BY THE PERSON EXAMPLE: RESIDENCE ADDRESS AND NAME | PERSONAL INFORMATION SELECTED BY THE PERSON EXAMPLE: TELEPHONE NUMBER | PERSONAL INFORMATION SELECTED BY THE PERSON | COMPANY INFORMATION EXAMPLE: COMPANY ID CARD | COMPANY INFORMATION EXAMPLE: WITHDRAWAL USING BANK CARD | WILL | APPLICATION |
| | | PUBLIC ORGANIZATION INFORMATION EXAMPLE: STUDENT ID | COMPANY INFORMATION EXAMPLE: BANK BALANCE INQUIRY | PUBLIC ORGANIZATION INFORMATION EXAMPLE: DELIVERY OF CERTIFICATE OF SEAL IMPRESSION | DATA RETRIEVAL WHEN THE PERSON DIED | |
| | | MEDICAL INFORMATION | PUBLIC ORGANIZATION INFORMATION EXAMPLE: CHANGE OF RESIDENCE | | | |

FIG. 3

| # | REFERENCE CODE REGION | SUBJECT REGION | CONTENT REGION | DATE OF UPDATE | REMARK REGION |
|---|---|---|---|---|---|
| 00 | PERSONAL INFORMATION | PASSWORD | XXXX | 199*/*/* | ALPHANUMERIC, ONE-BYTE CHARACTERS |
| 01 | PERSONAL INFORMATION | FINGERPRINT | IMAGE DATA | 199*/*/* | |
| 1 | PERSONAL INFORMATION | NAME | TARO TOKKYO | 199*/*/* | (PRONUNCIATION) |
| 2 | PERSONAL INFORMATION | DATE OF BIRTH | 19XX/mm/dd | 199*/*/* | |
| 3 | PERSONAL INFORMATION | RESIDENCE ADDRESS | | 199*/*/* | |
| 4 | PERSONAL INFORMATION | TELEPHONE NUMBER | OOO-XXX-YYY | 199*/*/* | |
| 5 | PERSONAL INFORMATION | BLOOD TYPE: ABO | | 199*/*/* | |
| 6 | PERSONAL INFORMATION | BLOOD TYPE: Rh | | 199*/*/* | |
| 7 | PERSONAL INFORMATION | BANK OO ACCOUNT BALANCE | 10,000,000 | 20**/*/* | |
| 8 | PERSONAL INFORMATION | POINTS FOR DISCOUNT STORE B | 100 | 20**/*/* | |
| 9 | PERSONAL INFORMATION | | | | |
| 10 | BANK OO | BANK CODE | XXX | 20**/*/* | READ AND WRITTEN ONLY IN BANK OO |
| 11 | BANK OO | ACCOUNT NUMBER | 123456 | 20**/*/* | READ AND WRITTEN ONLY IN BANK OO |
| 12 | BANK OO | IDENTIFICATION NUMBER | AAAA | 20**/*/* | READ AND WRITTEN ONLY IN BANK OO |
| 13 | BANK OO | TRANSFER DESTINATION | BBBBBB | 20**/*/* | READ AND WRITTEN ONLY IN BANK OO |
| 14 | | ACCOUNT NUMBER 1 | | 20**/*/* | READ AND WRITTEN ONLY IN BANK OO |
| 15 | BANK OO | ACCOUNT BALANCE | 10,000,000 | 20**/*/* | READ AND WRITTEN ONLY IN BANK OO |
| 16 | COMPANY: K CORPORATION | COMPANY CODE | WWWW | 20**/*/* | READ AND WRITTEN ONLY IN K CORPORATION |
| 17 | COMPANY: K CORPORATION | NAME CODE | XXX | 20**/*/* | READ AND WRITTEN ONLY IN K CORPORATION |
| 18 | COMPANY: K CORPORATION | DEPARTMENT/DIVISION | XXX | 20**/*/* | READ AND WRITTEN ONLY IN K CORPORATION |
| 19 | CONSUMER FINANCE: A CORPORATION | CODE OF A CORPORATION | | 20**/*/* | READ AND WRITTEN ONLY IN A CORPORATION |
| 20 | CONSUMER FINANCE: A CORPORATION | ACCOUNT NUMBER | | 20**/*/* | READ AND WRITTEN ONLY IN A CORPORATION |
| 21 | CONSUMER FINANCE: A CORPORATION | IDENTIFICATION NUMBER | | 20**/*/* | READ AND WRITTEN ONLY IN A CORPORATION |
| 22 | DISCOUNT STORE B | CODE OF STORE B | XXX | 20**/*/* | READ AND WRITTEN ONLY IN STORE B |
| 23 | DISCOUNT STORE B | CUSTOMER CODE | XXX | 20**/*/* | READ AND WRITTEN ONLY IN STORE B |
| 24 | DISCOUNT STORE B | POINTS | 100 | 20**/*/* | READ AND WRITTEN ONLY IN STORE B |
| 25 | MUNICIPAL OFFICE | NAME | TARO TOKKYO | 199*/*/* | READ AND WRITTEN ONLY IN MUNICIPAL OFFICE |
| 26 | MUNICIPAL OFFICE | RESIDENCE ADDRESS | XXX, KASUMIGASEKI, TOKYO | 199*/*/* | READ AND WRITTEN ONLY IN MUNICIPAL OFFICE |
| 27 | MUNICIPAL OFFICE | TELEPHONE NUMBER | OOO-XXX-YYY | 199*/*/* | READ AND WRITTEN ONLY IN MUNICIPAL OFFICE |

PERSONAL INFORMATION AREA | COMPANY INFORMATION AREA | PUBLIC ORGANIZATION INFORMATION AREA a, b CORRESPONDING DATA

FIG. 4

RECORDING MEDIUM, RECORDING MEDIUM READING/WRITING APPARATUS, AND METHOD OF USING RECORDING MEDIUM

BACKGROUND OF THE INVENTION

1. Field of Invention

The present invention relates to a recording medium, such as an IC card, a recording medium reading/writing apparatus, and a method of using the recording medium. More specifically, the present invention relates to a recording medium, a recording medium reading/writing apparatus, and a method of using the recording medium which allow a single recording medium (such as an IC card) to be used for a plurality of applications and which allow different security levels to be set up for the application of information to be recorded.

2. Description of Related Art

The current society can be referred to as a card or cashless society, and various types of cards can be used for a variety of applications, including ID cards, credit cards, ID certificates, bank cards, prepaid cards, point cards to record the frequency of use of shops or facilities, debit cards, and IC telephone cards. Such cards are issued according to specifications defined by card providers who provide services for card users in order to provide benefits for both the card providers and the card users.

However, individuals who use cards must always carry a number of cards depending upon the application, and must use different cards according to the purpose, which can bother such individuals. In some cases, users who desire issuance of a card, such as a credit card, must submit a card issuance application form filled in with necessary information and must wait for a few days for the card to be issued and mailed.

Another problem is that card providers must prepare cards that are specific to the purpose and method of use of the card. Furthermore, the card providers or stores in which cards are used must prepare a card reader or a card writer suitable for the card to write necessary information to the card or update the information stored in the card.

SUMMARY OF THE INVENTION

The present invention addresses or solves the above and/or other problems, and provides a recording medium, such as an IC card, having multipurpose functions, and a recording medium, a recording medium reading/writing apparatus, and a method of using the recording medium which allow different security levels to be set up for the application of information to be recorded.

According to the present invention, a recording medium includes an identity verification information area in which information to verify the identity of a recording medium owner is recorded; a personal information area in which personal information of the recording medium owner is classified and recorded with different security levels set up; and a company or organization information area in which company or organization record information of a company or organization using an encryption key unique to the company or organization is provided.

Thus, a user is able to use a single recording medium (such as an IC card) which he/she carries for multipurpose applications. A unified recording medium issued by each company or organization can be used, thus making it possible to reduce the cost involved with issuing recording media. Furthermore, a lost recording medium cannot be abused by others. The uniformity of recording media, such as IC cards and the standardization of identity verification information expedite issuance of recording media.

In the recording medium of the present invention, the personal information area is formed of an information area accessed with verification of the identity, and an information area accessed without verification of the identity.

Thus, a user of the recording medium is able to separately record personal information to be freely disclosed to a third party, such as residence address and name, and secret personal information, such as date of birth and family structure, in the recording medium.

In the recording medium of the present invention, when data is written to the company or organization information area, pre-selected information of the data is also recorded in an appropriate region of the personal information area at the same time.

Therefore, information, such as "bank account balance" or "accumulated points for a discount store" among the information written to the company or organization information area, can be accessed at any time by a user at home.

In the recording medium of the present invention, the information recorded in the personal information area and the company or organization information area can be classified and recorded with different security levels.

Therefore, security levels can flexibly be set up according to the type of information, such as using only the "identity verification information", the "encryption key", the "password", or the like, or using a combination thereof.

In the recording medium of the present invention, the information recorded in the recording medium contains information which can be referred to by authentication of a plurality of individuals.

Therefore, in a case in which it is impossible to verify the identity of a person, such as when a will is disclosed after the person has died, the information can be viewed while maintaining the security.

In the recording medium of the present invention, the information to verify the identity or authenticate the individuals contains fingerprint or other biometric data.

Thus, since verification of the identity is accomplished based on fingerprint or other biometric data (voiceprints or irises), such inconvenience that is associated with a password, such as the fact that it is not desirable for a third party to know the password, is avoided, thus achieving high-level security.

In the recording medium of the present invention, the information to verify the identity or authenticating the individuals further contains a password.

Therefore, security can be applied using the "identity verification information" (such as fingerprint information), the "encryption key", and the "password", so that significantly high-level security can be applied to particularly important information.

In the recording medium of the present invention, the information to verify the identity or authenticate the individuals contains a password.

Therefore, security can be applied using the "password".

In the recording medium of the present invention, the recording medium is a contact or contactless IC card.

Therefore, any kind of IC card may be used.

According to the present invention, furthermore, a recording medium reading/writing apparatus to write information to a recording medium and to read the information from the recording medium includes a device to read identity verification information input by a recording medium owner to verify the identity of the recording medium owner; a device to write the identity verification information input by the recording medium owner to an identity verification information area of the recording medium, and to read the recorded identity verification information; a device to compare the identity verification information input by the recording medium owner with the identity verification information recorded in the recording medium to verify the identity; a device to classify and write personal information of the recording medium owner to a personal information area with different security levels set up, and to read the recorded personal information according to the set up security levels; and a device to write information of a company or organization to a company or organization information area of the recording medium using an encryption key unique to the company or organization, and to read the recorded information of each company or organization using the encryption key unique to the company or organization.

With the structure of the present invention, a recording medium, such as an IC card, is provided with an area in which information to verify the identity of a user, such as fingerprint information, is recorded, an area in which personal information of the user is recorded, and an area in which company or organization information is recorded. The information is recorded with security levels set up according to the information content. The company or organization information is recorded and read using an encryption key unique to each company or organization. Therefore, the "identity verification information", such as fingerprint information, and the "encryption key" are used to ensure high-level security. Furthermore, information of each company or organization is read and written only by the company or organization, thus enabling information of a plurality of companies and organizations to be separately recorded without interfering with each other. Thus, a user is able to use a single recording medium (such as an IC card) which he/she carries for multi-purpose applications with safety. A unified recording medium issued by each company or organization can be used, thus making it possible to reduce the cost involved with issuing recording media. Furthermore, a lost recording medium cannot be abused by others. The uniformity of recording media, such as IC cards and the standardization of security, such as using fingerprint information, expedite issuance of recording media.

The recording medium reading/writing apparatus of the present invention further includes a device to record the personal information as information accessed with verification of the identity, and a device to record the personal information as information accessed without verification of the identity.

Thus, a user of the recording medium is able to separately record personal information to be freely disclosed to a third party, such as residence address and name, and secret personal information, such as date of birth and family structure, in a recording medium such as an IC card.

The recording medium reading/writing apparatus of the present invention further includes a device to, when data is written to the company or organization information area, also recording pre-selected information of the data in an appropriate region of the personal information area at the same time.

Therefore, information, such as "bank account balance" among the information written to the company or organization information area, can be accessed at any time by a user at home.

In the recording medium reading/writing apparatus of the present invention, the information recorded in the personal information area and the company or organization information area is classified and recorded with different security levels.

Therefore, security levels can be flexibly set up according to the type of information, such as using only the "identity verification information" (such as fingerprint information), the "encryption key", the "password", or the like, or using a combination thereof.

The recording medium reading/writing apparatus of the present invention further includes a device to read fingerprint or other biometric data of a user as the identity verification information; and a device to record the read biometric data serving as the identity verification information in the recording medium, and to read the biometric data from the recording medium.

Thus, since verification of the identity is accomplished based on fingerprint or other biometric data (voiceprints or irises), such an inconvenience that is associated with a password, such as the fact that it is not desirable for a third party to know the password, is avoided, thus achieving high-level security.

The recording medium reading/writing apparatus of the present invention further includes a device to record a password in the recording medium as the identity verification information, and to read the recorded password.

Therefore, security can be applied using the "identity verification information" (such as fingerprint information), the "encryption key", and the "password", so that significantly high-level security can be applied to particularly important information.

In the recording medium reading/writing apparatus of the present invention, the recording medium is a contact or contactless IC card.

Therefore, any kind of IC card may be used.

According to the present invention, a method of using a recording medium in which identity verification information to verify the identity of a recording medium owner, personal information of the recording medium owner, and information of a company or organization are recorded includes: comparing identity verification information input by the recording medium owner with the identity verification information recorded in the recording medium to verify the identity; classifying and writing the personal information with different security levels set up, and reading the personal information; and after verification of the identity, reading or writing information relating to the company or organization using an encryption key unique to the company or organization.

Thus, a user is able to use a single recording medium (such as an IC card) which he/she carries for multipurpose applications. A unified recording medium issued by each company or organization, such as an IC card, can be used, thus making it possible to reduce the cost involved with issuing recording media. Furthermore, a lost recording medium cannot be abused by others.

In the method of using a recording medium according to the present invention, fingerprint information or other biometric data of a user is used as the identity verification information input by the recording medium owner and the identity verification information recorded in the recording medium.

Thus, since verification of the identity is accomplished based on fingerprint or other biometric data (voiceprints or irises), such inconvenience associated with a password that it is not desirable for a third party to know is avoided, thus achieving high-level security.

According to the present invention, a computer program that causes a computer in a recording medium recording/writing apparatus that writes information to a recording medium and that reads information from the recording medium includes: a program for reading identity verification information input by a recording medium owner to verify the identity of the recording medium; a program for writing the identity verification information input by the recording medium owner to an identity verification information area of the recording medium, and reading the recorded identity verification information; a program for comparing the identity verification information input by the recording medium owner with the identity verification information recorded in the recording medium to verify the identity; a program for classifying and writing personal information of the recording medium owner to a personal information area with different security levels set up, and reading the recorded personal information according to the set up security levels; and a program for writing information of each company or organization to a company or organization information area of the recording medium using an encryption key unique to the company or organization, and reading the recorded information of each company or organization using the encryption key unique to the company or organization.

BRIEF DESCRIPTION OF THE DRAWINGS

FIG. 3 is a table showing an example of information recorded with security levels;

FIG. 4 is a schematic showing a specific example of the stored information;

DETAILED DESCRIPTION OF PREFERRED EMBODIMENTS

Figure 1:
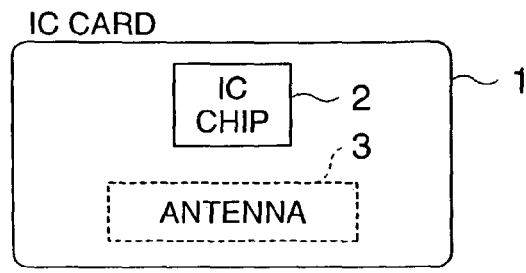
FIG. 1 is a schematic showing the shape of an IC card according to the present invention.

An exemplary embodiment of the present invention is described below in conjunction with an example shown in the drawings.

The present invention is intended to incorporate a plurality of types of typically used cards into a single recording medium, and such a recording medium is implemented herein as an IC card.

IC cards themselves are included in the related art, and therefore they are described briefly and a detailed description thereof is omitted. IC cards include a memory-card-type IC card having an IC chip embedded therein and having only a memory chip, and a built-in-CPU-type IC card incorporating a CPU. In addition to the difference in type based on the presence or absence of a CPU, IC cards are also classified into two types, i.e., "contact IC cards" and "contactless IC cards". A contact IC card supplies power and exchanges data to/from an IC card reader/writer through terminals provided on the card surface. A "contactless card" is also referred to as an RF ID, and an antenna is embedded in the card. The contactless card supplies power and exchanges data via the medium of electromagnetic waves.

Since the contactless IC card exchanges data via the medium of electromagnetic waves, it is not necessary to attach the IC card to terminals of an IC card reader/writer, and instead it is only necessary to put the IC card near the IC card reader/writer. This prolongs the mechanical lifetime of the IC card and the IC card reader/writer, and does not bother users since it is not necessary to correctly insert the IC card into a slot.

A recording medium according to the present invention is applicable to any IC card of the above-described "memory card having only a memory chip", "built-in-CPU card also having a CPU", "contact IC card", and "contactless IC card". However, in an example shown in an exemplary embodiment discussed below, a "contactless IC card" is primarily used.

FIG. 1 is a schematic showing the shape of an IC card according to the present invention. An IC card 1 is constructed so that an IC chip 2 and an antenna 3 connected to the IC chip 2 are embedded in a plastic base material. In some cases, the IC chip 2 is implemented as a plurality of IC chips 2 to increase the storage capacity.

Figure 2:
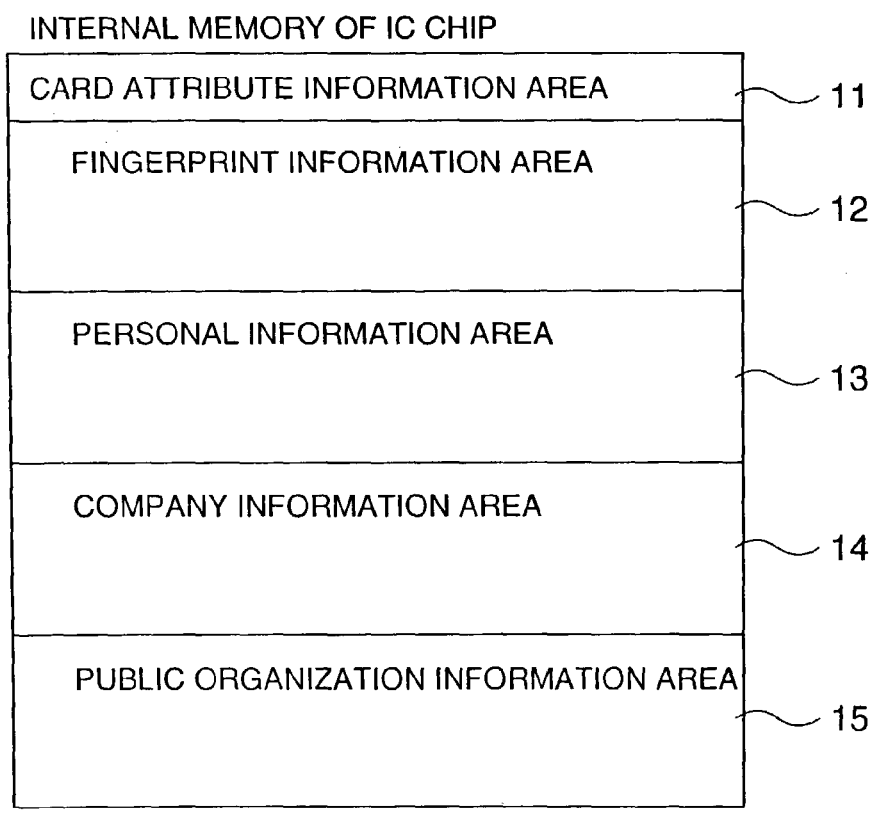
FIG. 2 is a schematic showing the type of information stored in an IC chip.

FIG. 2 is a schematic showing the types of information stored in the IC chip 2, indicating only information which is directly related to the present invention. A memory 10 has a card attribute information area 11 in which an IC card number, the date of issue, and so on are recorded, a fingerprint information area 12 in which fingerprint information of a card owner, and if necessary, fingerprint information of a plurality of individuals concerned with the card owner are recorded, a personal information area 13 in which personal information of the card owner is recorded, a company information area 14 in which information of a company which provides services for the card owner is written, and a public organization information area 15 in which information of public organizations or medical institutions such as municipal offices, ward offices, driver's license centers, and hospitals is recorded.

The personal information area 13, the company information area 14, and the public organization information area 15 are further divided into sections each having a different security level and each having data recorded therein using an encryption key and encryption algorithm which differ from one company or organization to another.

(1) Personal Information Area

The personal information area 13 is an area in which a user is free to write and read information using an IC card reader/writer attached to a personal computer or the like at home. In the personal information area 13, personal information which can be freely read by a third party without verification of the identity can be separated from personal information which requires fingerprint verification or a password, which are then stored with different security levels set up.

In one method of using the personal information stored in the personal information area 13, for example, an IC card in which "residence address information" and so on are written in advance using an IC card reader/writer attached to a personal computer of a user is taken to a municipal office or the like, and the "residence address information" is read using an IC card reader/writer installed in the municipal office to change the residence address in the municipal office.

(2) Company Information Area 14

The company information area 14 is allocated to each company related to the user. The data is written to and read from the company information area 14 using an "encryption key" and "encryption algorithm" unique to each company. This information area is therefore an area to and from which each company can individually write and read data without intervention of any other company or third party.

When a bank or the like writes information to this information area, for example, the information, such as "account balance information", may also be written to an appropriate area of the personal information area 13 at the same time. Thus, a user is able to view the "account balance information" stored in the personal information area 13 at home by using his personal computer and the IC card reader/writer attached thereto.

(3) Public Organization Information Area 15

The organization information area 15 is an area in which information of local public organizations, such as municipal offices and ward offices, driver's license centers, medical institutions, and so on is recorded.

The data is written to and read from the organization information area 15 using an "encryption key" and "encryption algorithm" unique to each organization. This information area is therefore an area to and from which each organization can individually write and read data without intervention of any other organization or third party.

The data of medical institutions may be read with a fingerprint of a person when the person is hospitalized due to disease or accident.

According to the present invention, furthermore, the information written to the personal information area 13, the company information area 14, and the public organization information area 15 can be read and written with different security levels set up for the information content. FIG. 3 is a table showing an example of information recorded with security levels, and various types of information content are recorded with the following security levels, by way of example:

(1) Security Level ①

The information recorded with this security level is information freely readable by a third party. For example, personal information, such as residence address and name, may be information freely readable by a third party without security being applied by particular selection of the corresponding person.

(2) Security Level ②

The information recorded with this security level is information readable or writable with "password" verification. For example, information such as date of birth and family structure may be readable with "password" verification.

(3) Security Level ③

The information recorded with this security level is information readable or writable with fingerprint verification. For example, disease history or medical information of a person is readable only when a fingerprint of the person is verified. This security level may be used for storage of "student ID" information at school and so on.

(4) Security Level ④

The information recorded with this security level is information writable and readable with "fingerprint verification" and the "encryption key". For example, for "bank balance inquiry", fingerprint verification is performed using an IC card reader/writer installed in a bank, and the IC card data is then read and written using the encryption key unique to the bank.

(5) Security Level ⑤

The information recorded with this security level is information readable and writable with fingerprint verification, the encryption key, and entry of a password. For example, when money is drawn from a bank, fingerprint verification is performed using the IC card reader/writer installed in the bank, after which the IC card data is read and written using the encryption key and a depositor further enters a password (or identification number) to draw money.

(6) Security Level ⑥

The information is recorded with this security level in a case in which fingerprints of a plurality of individuals are to be verified. For example, when a person died, fingerprints of his family members are verified to retrieve the IC card data.

In the present invention, therefore, a plurality of hierarchical security levels and an encryption key for each company or organization can be set up, and the security level of data to be read and written can be set up accordingly.

FIG. 4 is a schematic showing a specific example of the stored information. In FIG. 4, the information can be handled in the following way:

(1) Basic personal information, such as "name", "residence address", and "date of birth", must be less confidential, and may be freely read by a third party (including a company and an organization) without setting up security.

(2) When the information stored in the information areas of "Bank ○○", "Company: K Corporation", "Consumer Finance: A Corporation", and "Discount Store B" is read and written, the information is encoded and decoded using an "encryption key" and "encryption algorithm" unique to each of the companies after verification of the identity based on fingerprint information. Therefore, the information area of each company can be handled only by that company having an "encryption key" unique thereto. An "encryption key" is also used for public organizations such as "municipal offices".

(3) Predetermined information contained in the company or organization information area, such as "account balance information" and "point information" indicated by dotted arrows "a" and "b", respectively, may also be written to the corresponding region of the personal information area at the same time when the information is written to the company information area by the corresponding company.

The first time an IC card is created or when it is re-issued, personal information is written in advance to the IC card using a personal computer and personal IC card reader/writer described below. The IC card having the personal information written therein is taken to a bank, a store, or the like, where necessary information is written to the IC card. Therefore, the IC card can be issued easily and rapidly.

Figure 5:
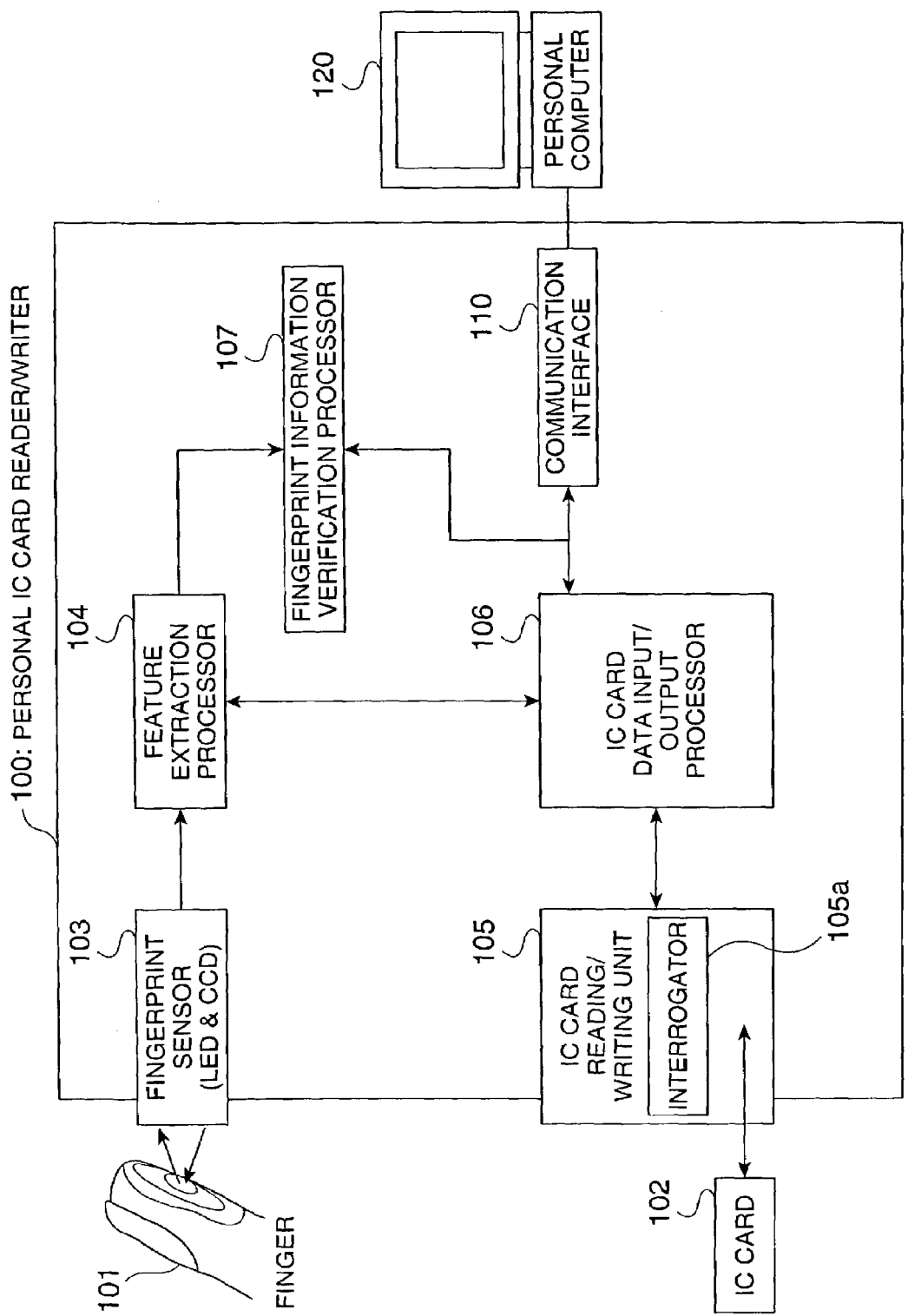
FIG. 5 is a schematic showing an example structure of a personal IC card reader/writer.

FIG. 5 is a schematic showing an example structure of a personal IC card reader/writer equipped with a fingerprint verifier, which is used when a user writes and reads data to and from the personal information area of the IC card using a personal computer or the like at home.

In FIG. 5, reference numeral 101 denotes a user's finger (such as the "middle finger") whose fingerprint is to be captured, reference numeral 102 denotes an IC card, reference numeral 103 denotes a fingerprint sensor including a light-emitting diode (LED) and a photosensor (CCD), reference numeral 104 denotes a fingerprint feature extraction processor, reference numeral 105 denotes an IC card reading/writing unit which exchanges data to/from the IC card, reference numeral 105*a* denotes an interrogator, reference numeral 106 denotes an IC card data input/output processor, reference numeral 107 denotes a fingerprint information verification processor, reference numeral 110 denotes a communication interface with a personal computer, and reference numeral 120 denotes a personal computer.

In this example, the personal IC card reader/writer equipped with a fingerprint verifier is shown, by way of example. However, an IC card reader/writer without a fingerprint verifier may be used. The interrogator 105*a* is a transmission/reception apparatus for wirelessly transmitting and receiving data to and from the IC card.

The operation of a personal IC card reader/writer equipped with a fingerprint verifier illustrated in FIG. 5 is described below.

(1) Operation of Reading and Verifying User Fingerprint

The fingerprint of the user's finger 101 is captured by the fingerprint sensor 103. The features of the captured fingerprint information are extracted by the feature extraction processor 104.

Meanwhile, fingerprint information stored in the IC card 102 is read by the interrogator 105a of the IC card reading/writing unit 105.

The fingerprint information read from the IC card 102 and the fingerprint information captured from the user's finger are compared by the fingerprint information verification processor 107 to verify the identity.

(2) Operation of Writing User Fingerprint Information to IC Card

The fingerprint of the user's finger 101 is captured by the fingerprint sensor 103. The features of the captured fingerprint information are extracted by the feature extraction processor 104.

The feature-extracted fingerprint information is stored into the IC card 102 through the medium of electromagnetic waves by the interrogator 105a of the IC card reading/writing unit 105 via the IC card data input/output processor 106.

(3) Operation of Writing Personal Information to IC Card 102

The personal information data to be written to the IC card 102, such as "residence address information", is received from the personal computer 120 via the communication interface 110.

The "residence address information" received via the communication interface 110 is transmitted to the IC card reading/writing unit 105 via the IC card data input/output processor 106, and is then stored into the IC card 102 by the interrogator 105a through the medium of electromagnetic waves.

(4) Operation of Reading Personal Information Stored in IC Card

The personal information data read from the IC card 102, such as "residence address information", is read by the interrogator 105a of the IC card reading/writing unit 105.

The "residence address information" data read from the IC card 102 is transmitted from the IC card reading/writing unit 105 to the IC card data input/output processor 106, and is further transmitted to the personal computer 120 via the communication interface 110.

Figure 6:
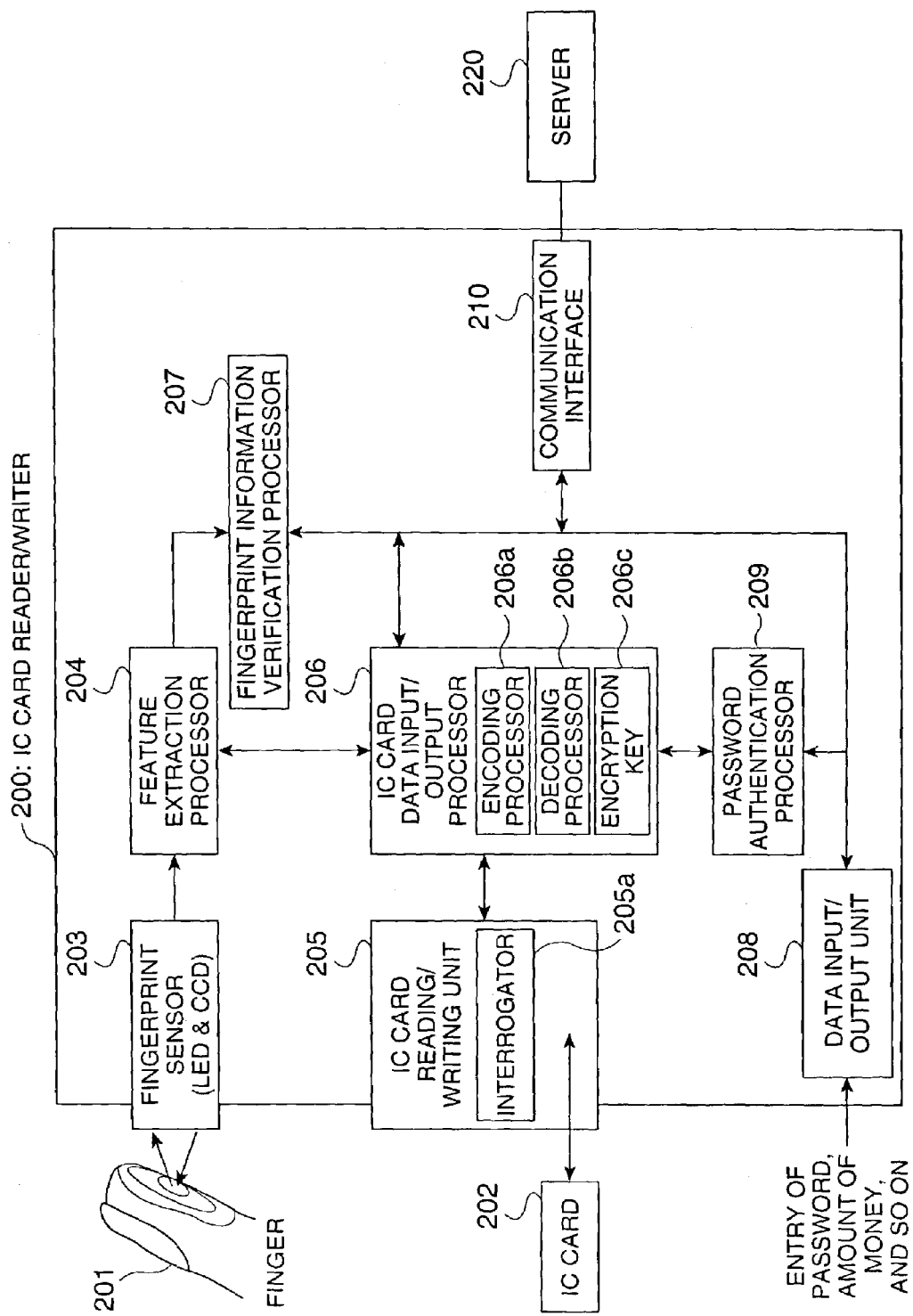
FIG. 6 is a schematic showing an example structure of a commercial IC card reader/writer.

FIG. 6 is a schematic showing an example structure of a commercial IC card reader/writer equipped with a fingerprint verifier which is used in companies and organizations and which is installed at, for example, a counter or CD (cash dispenser) corner in a bank.

In FIG. 6, reference numeral 201 denotes a user's finger (such as the "middle finger") whose fingerprint is to be captured, reference numeral 202 denotes an IC card, reference numeral 203 denotes a fingerprint sensor including a light-emitting diode (LED) and a photosensor (CCD), reference numeral 204 denotes a fingerprint feature extraction processor, reference numeral 205 denotes an IC card reading/writing unit which exchanges data to/from the IC card, reference numeral 205a denotes an interrogator, reference numeral 206 denotes an IC card data input/output processor, reference numeral 206a denotes an encoding processor, reference numeral 206b denotes a decoding processor, reference numeral 206c denotes an encryption key, reference numeral 207 denotes a fingerprint information verification processor, reference numeral 208 denotes a data input/output unit such as a touch panel, reference numeral 209 denotes a password authentication processor, reference numeral 210 denotes a communication interface, and reference numeral 220 denotes a server.

The operation of a commercial IC card reader/writer equipped with a fingerprint verifier illustrated in FIG. 6 is described below.

(1) Operation of Reading and Verifying User Fingerprint

The fingerprint of the user's finger 201 is captured by the fingerprint sensor 203. The features of the captured fingerprint information are extracted by the feature extraction processor 204.

Meanwhile, fingerprint information stored in the IC card 202 is read by the interrogator 205a of the IC card reading/writing unit 205. If the fingerprint information read from the IC card 202 has been encoded, the encoded information is decoded by the decoding processor 206b of the IC card data input/output processor 206 using the "encryption key 206c".

The fingerprint information read from the IC card 202 and the fingerprint information captured from the user's finger are compared by the fingerprint information verification processor 207 to verify the identity.

(2) Operation of Writing User Fingerprint Information to IC Card

The fingerprint of the user's finger 201 is captured by the fingerprint sensor 203. The features of the captured fingerprint information are extracted by the feature extraction processor 204.

The feature-extracted fingerprint information is stored into the IC card 202 through the medium of electromagnetic waves by the interrogator 205a of the IC card reading/writing unit 205 via the IC card data input/output processor 206. If the fingerprint information is to be encoded before being stored, the fingerprint information is encoded by the encoding processor 206a of the IC card data input/output processor 206 using the "encryption key 206c".

(3) Operation of Writing Company Information to IC Card 202

The data to be written to the IC card 202, such as bank "account balance information", is received from the server 220 via the communication interface 210.

The "balance information" received via the communication interface 210 is encoded by the encoding processor 206a of the IC card data input/output processor 206 using the "encryption key 206c" unique to the corresponding company, and is then transmitted to the IC card reading/writing unit 205, where the information is then stored into the IC card 202 by the interrogator 205a through the medium of electromagnetic waves.

(4) Operation of Reading Company Information Stored in IC Card

The data to be read from the IC card 202, such as bank "account number" information, has been encoded using the "encryption key" unique to the corresponding company, before being recorded in the IC card 202.

The "account number" data recorded in the IC card 202 is read by the interrogator 205a of the IC card reading/writing unit 205.

The "account number" data read from the IC card 202 is decoded by the decoding processor 206b of the IC card data input/output processor 206 using the "encryption key 206c" unique to that bank.

The decoded "account number" data is transmitted to the server 220 via the communication interface 210.

(5) Password Authentication Operation

The "password" stored in the IC card 202 is read by the interrogator 205a of the IC card reading/writing unit 205. Since the "password" read from the IC card 202 has been encoded with the "encryption key 206c" unique to the corresponding company, the "password" is decoded by the decoding processor 206b of the IC card data input/output processor 206 using the "encryption key 206c".

Meanwhile, the user enters a "password" using the data input/output unit 208, such as a touch panel.

The password entered by the user is compared with the password read from the IC card by the password authentication processor 209 for identity authentication.

Figure 7:
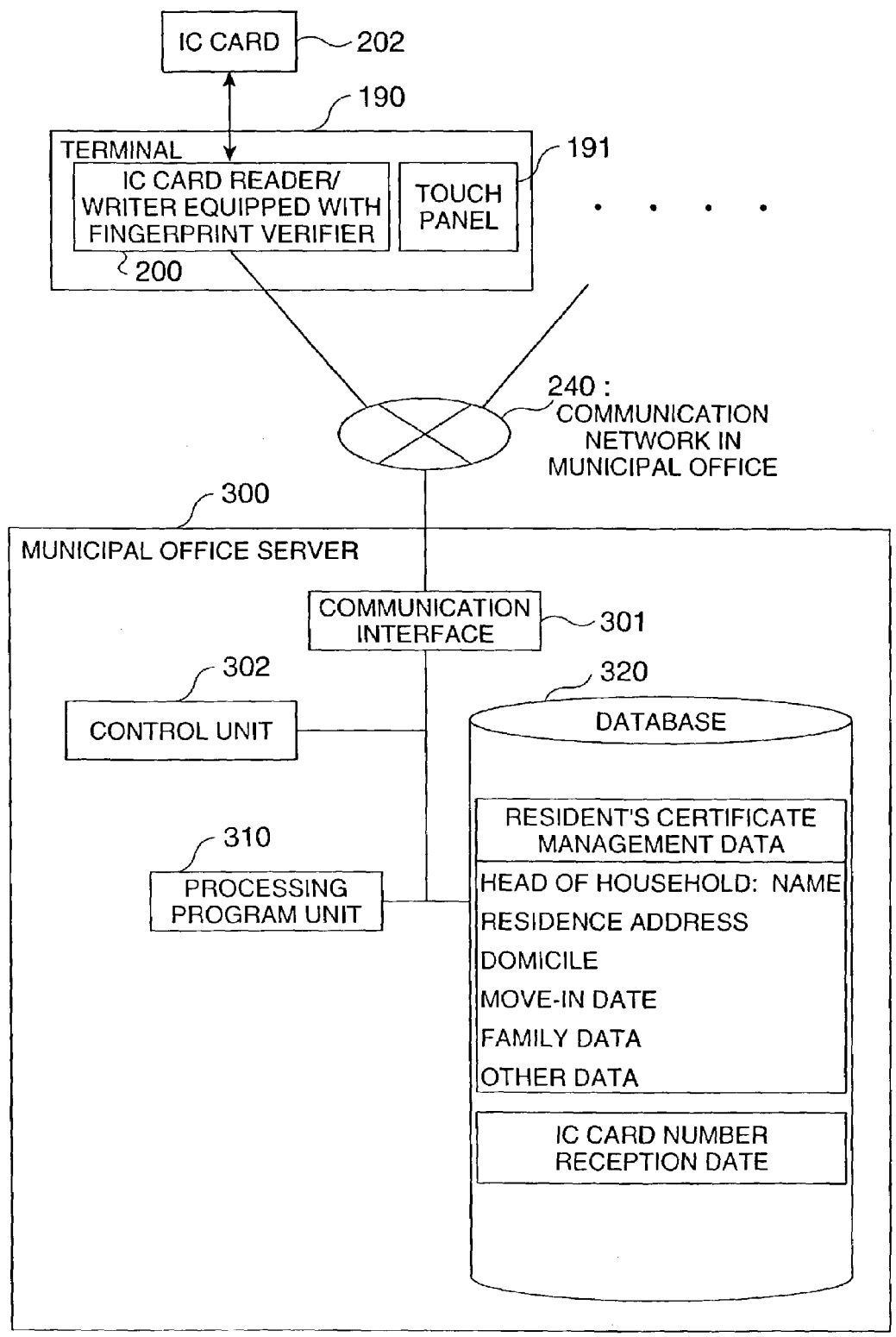
FIG. 7 is a schematic showing an example structure of a system which uses an IC card according to the present invention.

FIG. 7 is a schematic showing an example structure of a system which uses an IC card according to the present invention, showing a system that uses an IC card in a municipal office, by way of example. In this example, a change of residence is performed in a municipal office.

In FIG. 7, reference numeral 190 denotes a terminal installed at a counter in a municipal office, reference numeral 191 denotes a touch panel provided for the terminal 190, reference numeral 200 denotes a fingerprint-verifier-equipped IC card reader/writer provided for the terminal 190, reference numeral 240 denotes a communication network for connecting the terminal to a server within the municipal office, reference numeral 300 denotes the server in the municipal office, reference numeral 301 denotes a communication interface which interfaces with the communication network, reference numeral 302 denotes a control unit for controlling the overall server, reference numeral 310 denotes a processing program unit for performing various processes, and reference numeral 320 denotes a database. The fingerprint-verifier-equipped IC card reader/writer 200 shown in FIG. 7 corresponds to the IC card reader/writer having the structure shown in FIG. 6.

The following information is stored in the database 320 as information related to the present example:

resident's certificate management data including information such as "name of the head of household", "residence address", "domicile", "date of birth", "gender", "telephone number", "move-in date", "family data", "tax payment data", and "insurance-related data"; and IC-card-related information including data such as "IC card number" and "IC card reception date" received by the municipal office.

Figure 8:
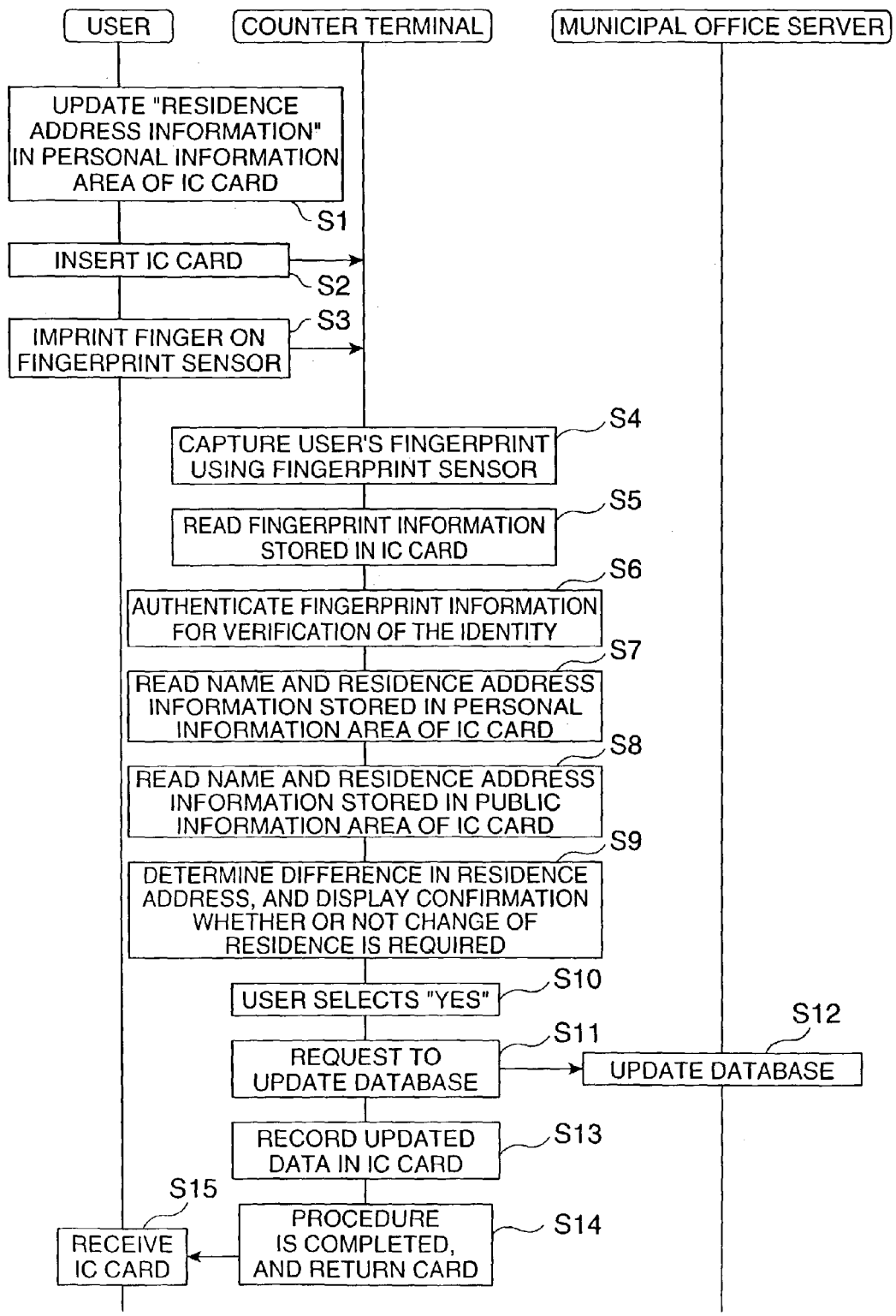
FIG. 8 is a flowchart illustrating the flow of operation of the system shown in FIG. 7.

FIG. 8 is a flowchart illustrating the flow of operation of the system shown in FIG. 7, showing the flow of operation when a user performs a "change of residence" in a municipal office. The flow of "change of residence" operation in a municipal office is described below with reference to FIG. 8.

(1) A user who desires to change the residence address updates residence address information stored in the personal information area of an IC card using a personal computer and IC card reader/writer at home (step S1).

(2) The IC card in which the residence address has been updated is taken to a municipal office.

(3) In the municipal office, the IC card 202 is inserted to a card slot of the IC card reader/writer 200 of the terminal 190 installed at a counter, and a user's finger is imprinted on a fingerprint sensor of the IC card reader/writer 200 (steps S2 and S3).

(4) The user's fingerprint is captured by the fingerprint sensor of the IC card reader/writer 200 (step S4). The fingerprint information stored in the IC card 202 is also read (step S5).

(5) The user's fingerprint information captured by the fingerprint sensor is compared with the fingerprint information read from the IC card 202 to perform "verification of the identity" (step S6).

(6) After verification of the identity based on the fingerprint information, the terminal 190 reads the "name and residence address information" contained in the personal information area of the user, and also reads the "name and residence address information" recorded in the public organization information area (steps S7 and S8).

(7) In the terminal 190, it is determined that the "residence address information" contained in the personal information area and the "residence address information" contained in the public organization information area differ from each other, and a message indicating "whether or not a change of residence is required" is presented to the user on the touch panel 191. Also presented are selection buttons of "YES" and "NO" (step S9).

(8) The user touches the "YES" button on the touch panel 191 (step S10).

(9) A request to update the residence address information in the database is transmitted from the terminal 190 to the municipal office server 300 (step S11). The server 300 updates the residence address data in the database 320 (step S12).

(10) When updating of the "residence address information" in the database 320 is completed, the terminal 190 uses the "encryption key" unique to the municipal office to update and record the residence address information authenticated by the municipal office to the public organization information area of the IC card 202 of the user (step S13).

(11) With the foregoing procedure, the change of residence procedure in the municipal office is completed, and the IC card is returned to the user (steps S14 and S15).

Although the exemplary embodiment of the present invention has been discussed in conjunction with an example in which "fingerprint information" is used for verification of the identity, the identity verification information including biometric data such as voiceprints, irises, and facial images, and patterns, such as hand-written signatures, in addition to the "fingerprint information", may also be used.

While an exemplary embodiment of the present invention is described above, each of the processors in the IC card readers/writers 100 and 200 shown in FIGS. 5 and 6 may be implemented by special hardware, or may be constructed of a memory and a general-purpose information processing apparatus such as a CPU (central processing unit), in which a program (not shown) for achieving the function of the processor is loaded to the memory and is executed to achieve the function.

When the function of each of the processors in the above-noted IC card readers/writers is achieved by a general-purpose information processing apparatus, such as a CPU (central processing unit), a program for achieving that function may be recoded in a computer-readable recording medium, and the program recorded in the recording medium may be read and executed by an internal computer of the IC card readers/writers, thereby achieving the function of the IC card readers/writers of the present invention.

The term "computer-readable recording medium" means a portable medium, such as a flexible disc, a magneto-optical disc, a ROM, and a CD-ROM, or a storage device, such as a hard disk built in a computer system. The term "computer-readable recording medium" may also include a unit for storing a program for a certain time, such as an internal volatile memory (RAM) of a computer system serving as a server or client when the program is transmitted over a network such as the Internet or a communication line such as a telephone line.

The above-noted program may be transmitted from a computer system having the program stored in a storage device thereof to another computer system via transmission media or through transmitted waves of the transmission media. As used herein, the term "transmission media" via which the program is transmitted means media via which information is transmitted, including a network (communication network), such as the Internet and a communication line (communication cable), such as a telephone line.

While an IC card and an IC card reader/writer according to the present invention have been described above, the present invention is not limited to the above-described example illustrated in the drawings, and it is anticipated that a variety of modifications may be made without departing from the scope and spirit of the present invention.

[Advantages]

As discussed above, a recording medium of the present invention includes an identity verification information area in which information to verify the identity of a recording medium owner is recorded; a personal information area in which personal information of the recording medium owner is recorded with security levels set up for the information content; and a company or organization information area in which company or organization write information of a company or organization using an encryption key unique to the company or organization is provided. Thus, a user is able to use a single recording medium (such as an IC card) which he/she carries for multipurpose applications with safety. A unified recording medium issued by each company or organization can be used, thus making it possible to reduce the cost involved with issuing recording media. Furthermore, a lost recording medium cannot be abused by others. The uniformity of recording media such as IC cards and the standardization of security based on "identity verification information" (such as fingerprint information) expedite issuance of recording media such as IC cards.

In the recording medium of the present invention, the personal information area is formed of an information area accessible with verification of the identity, and an information area accessible without verification of the identity. Thus, a user of the recording medium is able to separately record personal information to be freely disclosed to a third party, such as residence address and name, and secret personal information, such as date of birth and family structure, in the recording medium.

In the recording medium of the present invention, when data is written to the company or organization information area, pre-selected information of the data is also recorded in the personal information area at the same time. Therefore, information, such as "bank account balance" among the information written to the company or organization information area, can be accessed at any time by a user at home.

In the recording medium of the present invention, the information recorded in the personal information area and the company or organization information area can be classified and recorded with different security levels. Therefore, security levels can flexibly be set up according to the type of information, such as using only the "identity verification information" (such as fingerprint information), the "encryption key", the "password", or the like, or using a combination thereof.

In the recording medium of the present invention, the information recorded in the recording medium contains information which can be referred to by authentication of a plurality of individuals. Therefore, in a case in which it is impossible to verify the identity of a person, such as when a will is disclosed after the person has died, the information can be viewed while maintaining the security.

In the recording medium of the present invention, the information to verify the identity or authenticating the individuals contains fingerprint or other biometric data. Since verification of the identity is accomplished based on fingerprint or other biometric data (voiceprints or irises), such inconvenience associated with a password that it is not desirable for a third party to know is avoided, thus achieving high-level security.

In the recording medium of the present invention, the information to verify the identity or authenticating the individuals further contains a password. Therefore, security can be applied using the "identity verification information" (such as fingerprint information), the "encryption key", and the "password", so that significantly high-level security can be applied to particularly important information.

In the recording medium of the present invention, a contact or contactless IC card can be used as the recording medium. Therefore, any kind of IC card may be used.

In a recording medium reading/writing apparatus of the present invention, a recording medium such as an IC card is provided with an area in which information to verify the identity of a user, such as fingerprint information, is recorded, an area in which personal information of the user is recorded, and an area in which company or organization information is recorded. The information is recorded with security levels set up according to the information content. The company or organization information is recorded and read using an encryption key unique to each company or organization. Therefore, the "identity verification information", such as fingerprint information, and the "encryption key" are used to ensure high-level security. Furthermore, information of each company or organization is read and written only by the company or organization, thus enabling information of a plurality of companies and organizations to be separately recorded without interfering with each other. Thus, a user is able to use a single recording medium such as an IC card which he/she carries for multipurpose applications with safety. A unified recording medium issued by each company or organization can be used, thus making it possible to reduce the cost involved with issuing recording media. Furthermore, a lost recording medium cannot be abused by others. The uniformity of recording media such as IC cards and the standardization of security, such as using fingerprint information expedite issuance of recording media such as IC cards.

In the recording medium reading/writing apparatus of the present invention, the personal information is divided into information accessed with verification of the identity and information accessed without verification of the identity, which are recorded in a separate manner. Thus, a user of the recording medium is able to separately record personal information to be freely disclosed to a third party, such as "residence address and name", and secret personal information, such as "date of birth and family structure", in the recording medium such as an IC card.

In the recording medium reading/writing apparatus of the present invention, when data is written to the company or organization information area, pre-selected information of the data is also recorded in an appropriate region of the personal information area at the same time. Therefore, information such as "bank account balance" among the information written to the company or organization information area can be accessed at any time by a user at home.

In the recording medium reading/writing apparatus of the present invention, the information recorded in the personal information area and the company or organization information area is classified and recorded with different security levels. Therefore, security levels can be flexibly set up according to the type of information, using only the "identity verification information" (such as fingerprint information), the "encryption key", the "password", or the like, or using a combination thereof.

In the recording medium reading/writing apparatus of the present invention, the identity verification information contains fingerprint or other biometric data. Since verification of the identity is accomplished based on fingerprint or other biometric data (voiceprints or irises), such an inconvenience associated with a password, such as the fact that it is not desirable for a third party to know the password, is avoided, thus achieving high-level security.

In the recording medium reading/writing apparatus of the present invention, the information to verify the identity or authenticate the individuals further contains a password. Therefore, security can be applied using the "identity verification information" (such as fingerprint information), the "encryption key", and the "password", so that significantly high-level security can be applied to particularly important information.

In the recording medium reading/writing apparatus of the present invention, a contact or contactless IC card can be used. Therefore, any kind of IC card may be used.

In a method of using recording medium according to the present invention, an identity verification information area in which information to verify the identity of a recording medium owner is recorded, a personal information area in which personal information of the recording medium owner is recorded with security levels set up for the information content, and a company or organization information area in which each company or organization write information of the company or organization using an encryption key unique to the company or organization are provided. Thus, a user is able to use a single recording medium (such as an IC card) which he/she carries for multipurpose applications. A unified recording medium issued by each company or organization, such as an IC card, can be used, thus making it possible to reduce the cost involved with issuing recording media. Furthermore, a lost recording medium cannot be abused by others.

In the method of using a recording medium according to the present invention, fingerprint information or other biometric data of a user is used as the identity verification information recorded in the recording medium. Since verification of the identity is accomplished based on fingerprint or other biometric data (voiceprints or irises), the inconvenience associated with a password, such as the fact that it is not desirable for a third party to know the password, is avoided, thus achieving high-level security.

What is claimed is:

1. A recording medium, comprising:
   a verification information area configured to record a biometric datum; and
   a public organization information area configured to record individual information which is able to be written or read by either a first manner or a second manner, the first manner using an encryption key and an encryption algorithm without using the biometric datum, the second manner using the biometric datum without using the encryption key or the encryption algorithm,
   wherein information written to the public information area by usage of the biometric datum can be read from the public information area by either usage of the first manner or the second manner, and
   wherein information written to the public information area by usage of the encryption key and encryption algorithm can be read from the public information area by either usage of the first manner or the second manner.

2. The recording medium according to claim 1, further comprising:
   a card attribute information area memorizing at least an IC card number and a date of issue.

3. The recording medium according to claim 1, further comprising:
   a company information area configured to record a plurality of companies' information which are able to be written or read by using a first encryption key and a first encryption algorithm.

4. The recording medium according to claim 3, a security level of the company information area and a security level of the public organization information area being different.

5. The recording medium according to claim 1, further comprising:
   a personal information area configured to record an owner's personal information, the personal information able to be read without verification.

6. A recording medium according to claim 1, the individual information of the public organization information being configured to be read with an entry of a password in addition to the encryption key and the encryption algorithm.

7. A recording medium according to claim 1, the biometric datum being a fingerprint.

8. An IC chip, comprising:
   the recording medium according to claim 1.

9. An IC card, comprising:
   the recording medium according to claim 1; and
   an antenna.

10. An IC card, comprising:
    the recording medium according to claim 1;
    a CPU; and
    an antenna.

11. A system comprising:
    a sensor portion configured to read a first biometric datum of a first individual and a second biometric datum of a second individual;
    a first information portion configured to record a third biometric datum and a fourth biometric datum, the third biometric datum corresponding to the first biometric datum, the fourth biometric datum corresponding to the second biometric datum;
    a verification portion configured to directly compare the first biometric datum and the third biometric datum and to directly compare the second biometric datum and the fourth biometric datum; and
    a second information portion configured to record a first information, the first information being retrieved if the first biometric datum and the third biometric datum are judged as equal and the second biometric datum and the fourth biometric datum are judged as equal.

12. The system according to claim 11, the first information being an individual information which is able to be written or read by either a first manner or a second manner, the first manner being a usage of an encryption key and an encryption algorithm, the second manner being a usage of a biometric datum.

13. The system according to claim 11, further comprising:
    a card attribute information portion memorizing at least an IC card number and a date of issue.

14. The system according to claim 11, further comprising:
a company information portion configured to record a plurality of companies' information which are able to be written or read by using a first encryption key and a first encryption algorithm.

15. The system according to claim 14, a security level of the company information portion and a security level of a public organization information portion being different.

16. The system according to claim 11, further comprising:
a personal information portion configured to record an owner's personal information which is able to be read without verification.

17. The system according to claim 11, the first biometric datum being a fingerprint.

* * * * *